United States Patent [19]

Okamoto et al.

[11] Patent Number: 5,220,472
[45] Date of Patent: Jun. 15, 1993

[54] ROTARY DRUM FOR VIDEO TAPE RECORDER

[75] Inventors: Tomomi Okamoto; Hiroaki Ono, both of Ibaraki; Shinji Ozaki, Chiba; Kazuo Sakai, Ibaraki, all of Japan

[73] Assignee: Hitachi, Ltd., Tokyo, Japan

[21] Appl. No.: 662,619

[22] Filed: Feb. 27, 1991

[30] Foreign Application Priority Data

Feb. 28, 1990 [JP] Japan ............................. 2-45382
Apr. 13, 1990 [JP] Japan ............................. 2-96433

[51] Int. Cl.$^5$ ........................ G11B 5/52; G11B 21/04
[52] U.S. Cl. .............................. 360/107; 360/130.24
[58] Field of Search .............. 360/107, 130.21–130.24, 360/84–85

[56] References Cited

U.S. PATENT DOCUMENTS

4,163,266  7/1979  Tamamura .................. 360/130.21

Primary Examiner—A. J. Heinz
Attorney, Agent, or Firm—Antonelli, Terry, Stout & Kraus

[57] ABSTRACT

A surface of an upper rotary drum of a video tape recorder is machines such that it has a surface roughness in a range from 1 μm to 2 μm so as to enable a releasing of air on the upper rotary drum surface uniformly whereby a thickness of an air film between a magnetic tape and a head is uniformly reduced without affecting the tape running. The surface may be grooved concurrently with the roughened surface. A window is formed in rotary drum for receiving at least one magnetic head.

10 Claims, 7 Drawing Sheets

$0.8 l_1 \leq a \leq 3 l_1$
$0.8 l_3 \leq b \leq 3 l_3$

FIG. 10

$30° \leq a \leq 90°$

FIG. 11

$0.2° \leq \beta \leq 2.0°$

ROTARY DRUM FOR VIDEO TAPE RECORDER

BACKGROUND OF THE INVENTION

The present invention relates to a rotary drum mechanism for a video tape recorder for industrial use or home use and, more particularly, to an upper rotary drum of the rotary drum mechanism.

The present invention relates to a head window provided in a rotary drum of a commercial or home video tape recorder.

In a rotary drum type video tape recorder (VTR), a rotary drum device includes an upper rotary drum on which a plurality of magnetic heads are mounted and which is rotated at high speed with respect to the magnetic tape for recording and reproducing information in high frequency band.

In order to obtain a desired reproduction output from such magnetic heads, it is necessary to provide a reliable contact between the magnetic heads and the magnetic tape running with respect thereto at high speed.

In a commercial VTR, a high speed, short wavelength recording type drum is generally used. In such drum, it is difficult to obtain a good contact between the magnetic tape and the magnetic heads and reproduction output tends to be degraded largely on spacing loss.

It is known that, in a rotary drum of a video tape recorder of an upper rotary drum type in which only an upper drum portion thereof is rotated, there is an air film formed between a magnetic tape and the upper drum due to a relative motion of the upper drum with respect to the tape. With such air film, the tape can run without intimate contact with the drum, so that tape tension is reduced and any physical damage of tape is minimized. Further, with such air film, abrasion of the drum itself is reduced.

Although such air film is advantageous for reducing tape tension and physical damage to the tape, when the air film becomes thick beyond a certain value, an amount of protrusion of a head may reduced with respect to the tape. Therefore, a face pressure of the head with respect to the tape is reduced, resulting in a degradation of the contact of the head with the tape. This is particularly true in the commercial VTR drum in which the drum used is generally of high speed type.

In a portion of a tape at which the magnetic head starts to slide with respect to the magnetic tape (hereinafter "head inlet side"), air is drawn in by rotation of the drum to thereby float the tape with respect to the magnetic head. Further, since the magnetic head starts to scan the tape while kicking the latter through air, the contact of the magnetic head with the magnetic tape tends to be incomplete, resulting in degraded output. Thus, in the upper rotary drum type drum mechanism, it is very important to optimize the thickness of air film.

An example of the thickness optimization of air film is disclosed in Japanese Kokai (P) 61-214271. wherein grooves are formed on a surface on the upper drum through which air is allowed to be released to thereby reduce the thickness of the air film.

In the conventional technique mentioned above, when the rotational speed of the upper rotary drum increases, the number of grooves must be increased and/or the depth of each groove must be increased so that a total cross sectional area of the grooves is increased.

However, when the total cross sectional area of the grooves is increased, an amount of air flowing out from the space between the tape and head becomes very large around the grooves and so the air film thickness is undesirably reduced and, for some cases, the tape itself is deformed locally along such grooves.

The tape runs with respect to the rotary drum with a lead angle. If the tape is locally deformed along the grooves of the rotary drum, the tape tends to run along the grooves (rotating direction) and therefore it becomes difficult to run the tape along a lead portion provided on a lower fixed drum, causing the tape to be incapable of running linearly with the lead angle. Therefore, in order to run the tape linearly, it is necessary to force the tape downwardly to the lead portion by a tape running system; however, this may cause the tape to be physically damaged.

Further, the floating of the tape with respect to the head depends largely on a tape tension and, therefore, a variation of tape tension due to friction coefficient of such mechanism, servo system and/or tape sliding surface may cause the floating amount of the tape to be considerably changed.

Further, if the spacing between the tape and the head is too large when the relative speed of the tape with respect to the head is very high, the effect of spacing loss becomes considerable when, particularly, the recording wavelength is short.

SUMMARY OF THE INVENTION

An object of the present invention is to optimize the air film between the magnetic tape and the magnetic head of a high speed rotary drum device without adversely affecting the tape running.

Another object of the present invention is to improve the reliability of contact between the tape and head of the high speed rotary drum type device and particularly improve a head touch in even the head inlet side.

In order to achieve the above objects, a surface of an upper rotary drum portion is machined such that it has a surface roughness in a range from 1 $\mu$m to 2 $\mu$m. With this specific roughness of the drum surface, it becomes possible to release air on the upper rotary drum surface uniformly so that air film between the tape and head is reduced in thickness uniformly without affecting the tape running. It is, of course possible to use such grooves as mentioned previously concurrently with the roughed surface.

With such surface roughness, air releasing becomes uniform causing no local deformation of tape.

Further, according to the present invention, a window formed in a rotary drum, in which a magnetic head is received is defined such that it satisfies the following relationship:

$$0.8l \leq a \leq 3l$$

$$0.8l \leq b \leq 3l$$

where l is an length of the magnetic head in a sliding direction and a and b are distances from ridges of the window to opposite ends of the magnetic head received therein, respectively. With this relationship, it becomes possible for the tape to contact the head such that the tape can be wound around the magnetic head without damaging the tape. Thus, it is possible to obtain enough surface pressure with respect to the head and thus improve the head touch.

When the tape is about to be wound on the head, the length of the head in the window in the sliding direction affects the winding of the tape. When the length of the window in the sliding direction is short, it is impossible to wind the tape on the head sufficiently and so it is difficult to obtain a good contact between the tape and the head. On the contrary, when it is long, it is possible to wind the tape by a larger amount and thus it is possible to obtain a good contact between the tape and head. In the latter case, however, a deformation of tape may be increased causing the tape to be damaged.

DETAILED DESCRIPTION OF THE PREFERRED EMBODIMENTS

Figure 1:
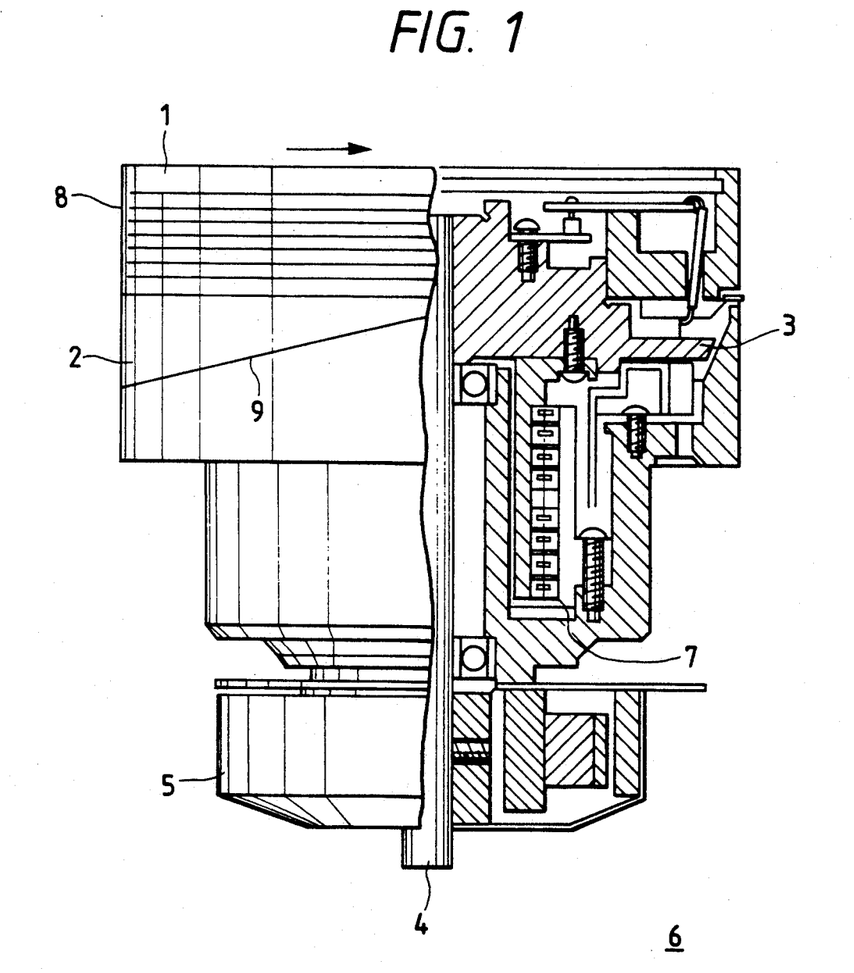
FIG. 1 shows in partial cross-sectional view of an upper drum rotating rotary drum device according to the present invention.

In FIG. 1, a rotary drum device generally designated by the reference numeral 6 includes a lower fixed drum 2 and an upper rotary drum 1 supported rotatably by the fixed drum 2. On the upper rotary drum 1, at least a magnetic head is mounted. The fixed drum 2 is mounted on a C—C base mounted on a chasis and a shaft 4 is rotatably supported by the fixed drum 2 through a bearing. The shaft 4 is pressure-inserted into a disk 3 on which the drum 1 is mounted. The upper rotary drum 1 and a magnetic recording tape are moved relatively at a speed v satisfying a relationship 10 m/s $\leq$ v $\leq$ 55 m/s.

The upper rotary drum 1 has a surface finished with roughness S satisfying a relation 1 $\mu$m $\leq$ S $\leq$ 2 $\mu$m and formed with seven V-shaped grooves. In a commercial VTR in which a large diameter and high speed rotary drum is usually employed, the relative speed of the tape and the drum is very large and so thickness of an air film therebetween is also very large. When the air film becomes too thick, a protruding amount of the magnetic head against the magnetic tape becomes relatively small relatively and therefore surface pressure of the tape with respect to the magnetic head becomes small, making it impossible to obtain a necessary head touch. Therefore, the thickness of air film must be optimized. The higher the relative speed between the upper rotary drum and the tape the thicker the air film. In order to reduce the thickness of air film, air is released. This air film thickness reduction is accomplished in the prior art by, as noted above providing grooves on the drum surface. However, the prior art approach is insufficient when the thickness of air film becomes very large due to increase of the relative speed.

Figure 2A:
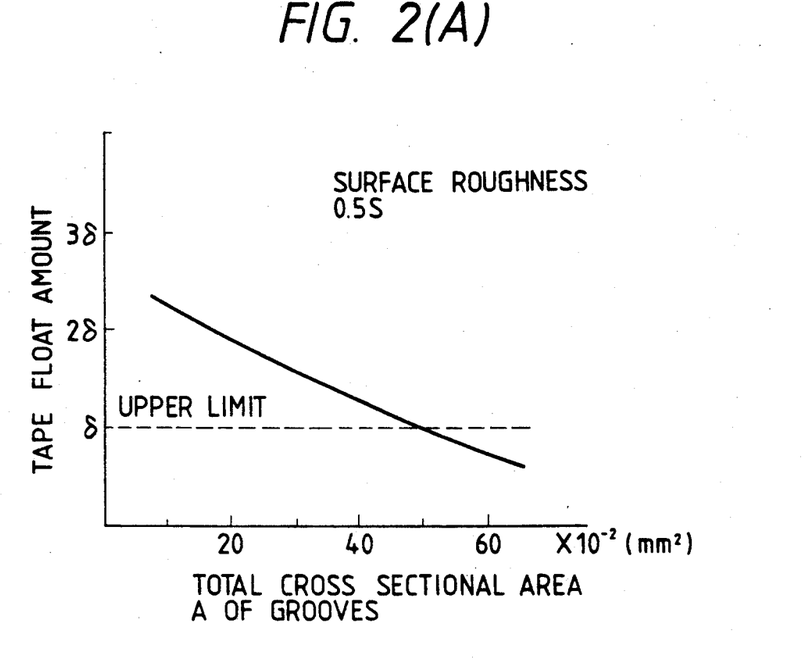
FIGS. 2(A) and 2(B) are graphical illustrations depicting an amount of floating of a tape and a tape pattern linearlity, with respect to a cross sectional area of grooves on the upper rotary drum, respectively.
Figure 2B:
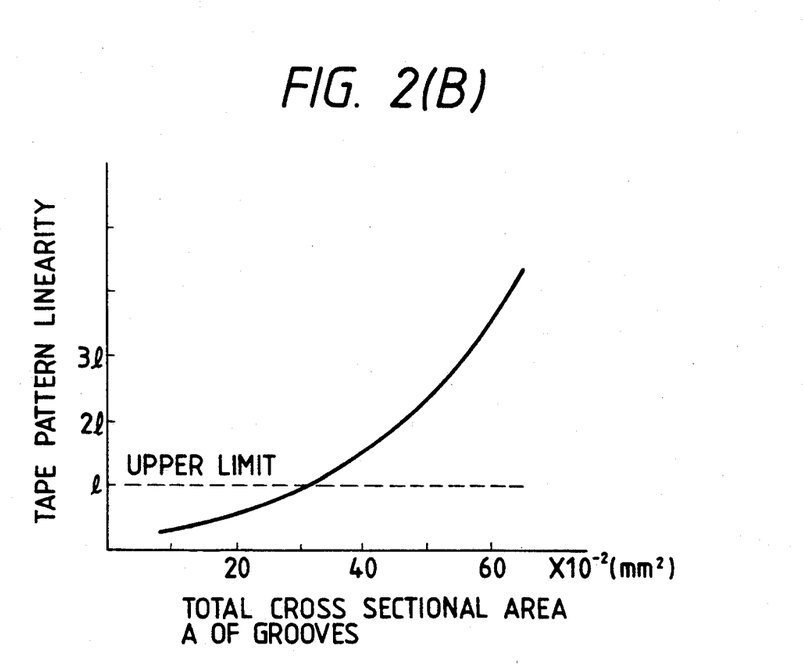

FIG. 2(A) is a graph showing a relation between an amount of floating-up of a tape with respect to a drum surface and a total cross sectional area of the grooves and FIG. 2(B) is a graph showing a relation between a tape pattern linearlity and the total cross sectional area of the grooves, with relative speed between the tape and the upper rotary drum being 27 m/s. When the protruding amount of the magnetic head is 55 $\mu$m and it is desired to restrict the tape floating amount not more than 15 $\mu$m in view of surface pressure of the tape with respect to the head and abrasion of the head ($-$15 $\mu$m), the cross sectional area of the grooves must be 0.5 mm$^2$ or more. However, as to the tape pattern, the area must be 0.3 mm or less when the permissible linearlity is 5 $\mu$m. When the cross sectional area of the grooves is large, air release becomes very large around each groove. Therefore, the tape may be deformed therearound due to an abrupt decrease of air film thickness. Due to such local deformation of the tape, the tape tends to run along the grooves causing the tape to be difficult to move toward a lead portion provided on the lower fixed drum. Thus, it becomes impossible to obtain a linearlity of the tape pattern, as mentioned above.

Figure 3A:
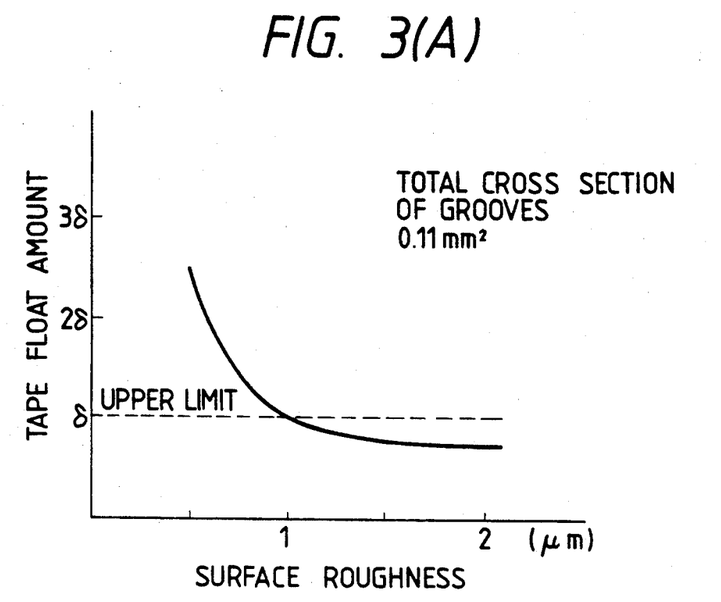
FIGS. 3(A) and 3(B) are graphical illustrations depicting an amount of floating of tape and a tape pattern linearlity with respect to surface roughness of the upper rotary drum, respectively.
Figure 3B:
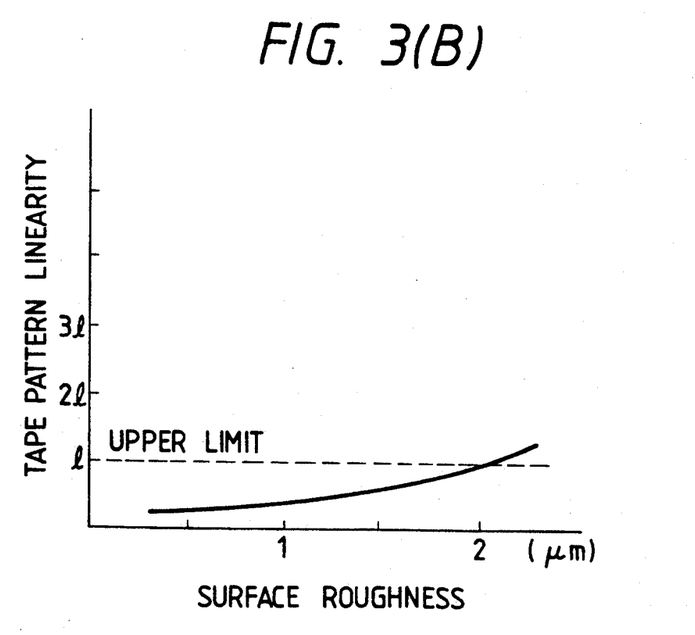

On the other hand, FIGS. 3(A) and 3(B) show relationships of the tape floating and the tape pattern linearlity with respect to surface roughness of the upper rotary drum, respectively. When it is desired to restrict the tape floating not more than 15 $\mu$m, it is sufficient to make the surface roughness S 1 $\mu$m or more since, due to such rough surface of the drum, air can uniformly released. Further, in view of the tape pattern linearlity, the surface roughness is preferably 2 $\mu$m or smaller. That is, the surface roughness S of the upper rotary drum should be between 1 $\mu$m $\leq$ S $\leq$ 2 $\mu$m.

Figure 4:
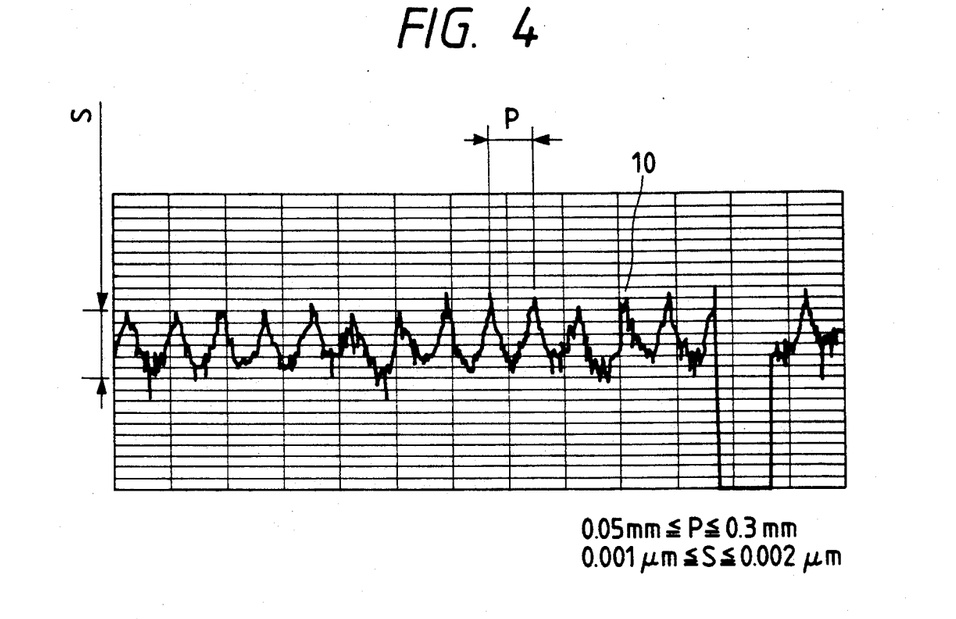
FIG. 4 is a graphical illustration depicting roughness of the upper rotary drum surface in cross section.
Figure 5:
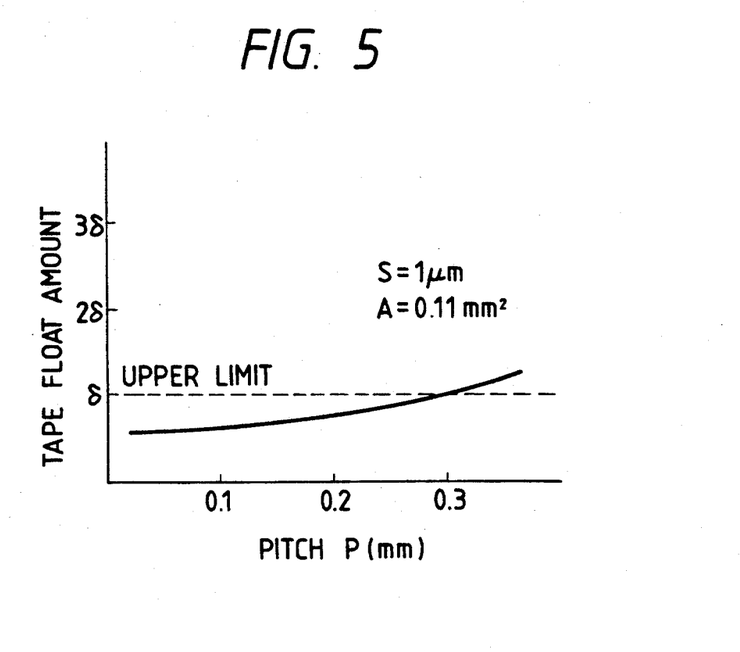
FIG. 5 is a graphical illustration depicting a floating of the tape with respect to the pitch of roughness of the upper rotary drum surface.

FIG. 4 shows a configuration of surface roughness of the upper rotary drum and FIG. 5 is a graph showing the floating of the tape with surface roughness pitch P. The roughness pitch P is preferably P $\leq$ 0.05 mm in view of machining roughness. Further, in view of the floating of the tape, the pitch P should be P $\leq$ 0.3 mm. Therefore, the pitch P should be selected as 0.05 $\leq$ P $\leq$ 0.3 mm.

In the rotary drum device, the tape runs linearly with a lead angle. The lower fixed drum is formed with a lead portion 9 (FIG. 1) along which the tape runs. Assuming that, in FIG. 1 the upper rotary drum is rotated in the direction at the arrow T while the tape is wound on the drum in a slanted direction along the lead portion, a force is exerted on the tape such that the latter is moved away from the lead portion.

The undulation of 1 $\mu$m to 2 $\mu$m produced on the rotary drum surface in machining the latter is necessarily extended in an angled direction with respect to the drum. Therefore, the roughness of the rotary drum surface can be provided by lathing the drum surface in an angled direction with respect to an axis of the rotary drum. In such case, since air is released downwardly, the tape may be forced downwardly facilitating tape to run along the lead portion.

Figure 6:
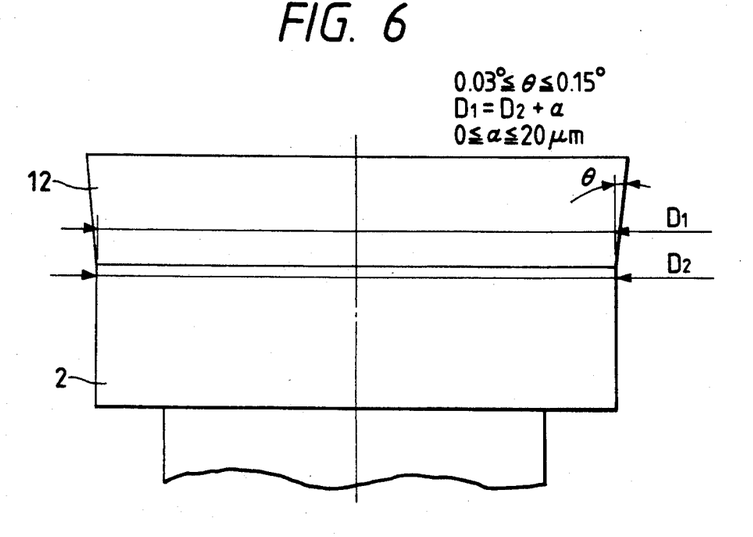
FIG. 6 is a schematic view showing, on an enlarged scale, a taper drum according to an embodiment of the present invention.

In order to further facilitate the tape running along the lead portion, it is possible to provide a taper on a lower portion of the upper rotary drum as shown in FIG. 6. In such case, a diameter D2 of the lower fixed drum can be set with respect to a diameter D1 of a lower end portion of the upper rotary drum according to the following relationship:

$$D1 = D2 + \alpha$$

where $0 \leq \alpha \leq 20$ μm. In this case, the tape is forced downwardly by tape tension during running. However, when the taper of the upper rotary drum is too large or the difference in diameter between the drums is too large, the tape running is degraded and the tape may be damaged. It has been experimentally determined that for a rotary drum device having diameter of 96.4 mm, when the taper is sued, the taper angle $\theta$ is preferably $0.03° \leq \theta \leq 0.15°$ and, when the diameter difference is used, the difference is preferably $0 \leq \alpha \leq 20$ μm.

As mentioned, in the rotary drum according to the present invention, the whole surface of the upper rotary drum of the rotary drum device is intentionally roughened; therefore, it is possible to uniformly reduce an air film between the running tape and the surface of the upper rotary drum of the rotary drum device rotating at high speed, resulting in a good head touch.

FIGS. 7(a) to 11 show another embodiment of the present invention in which, in order to further improve the head touch, a special relationship in dimension between a head and a window formed in the upper rotary drum for receiving the head is defined.

Figure 7A:
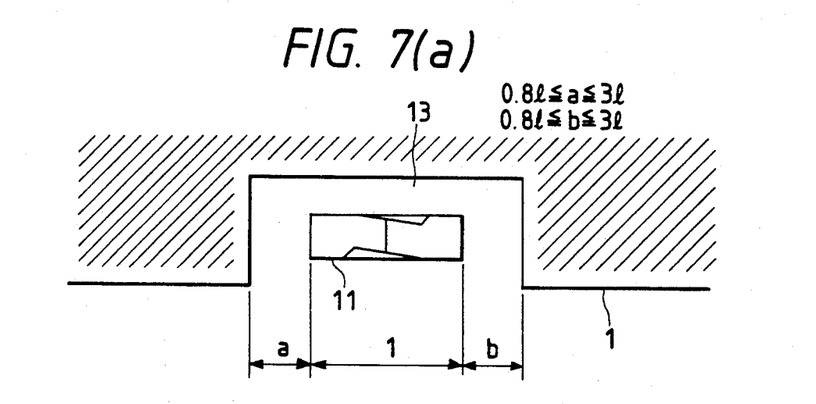
FIGS. 7(a) and 7(b) are a front view of a head window in which a head is disposed and a top view showing a tape running, according to the present invention.
Figure 7B:
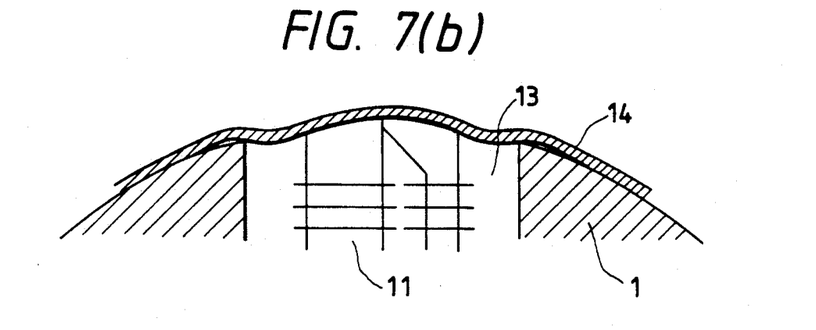

FIG. 7(a) is a front view of the head 11 in the window 13 formed in the upper rotary drum 1 and FIG. 7(b) is a plan view illustrating a tape 14 running over the drum. When the tape 14 runs at high speed with respect to the head 11 and the length l of the head and the distances $a$ and $b$ from the opposite edges of the window 13 and the opposite ends of the head, respectively, in the tape running direction are selected in accordance with the following relationship:

$$0.8 l < a < 3 l, \text{ and}$$

$$0.8 l < b < 3 l.$$

Figures 8A, 8B:
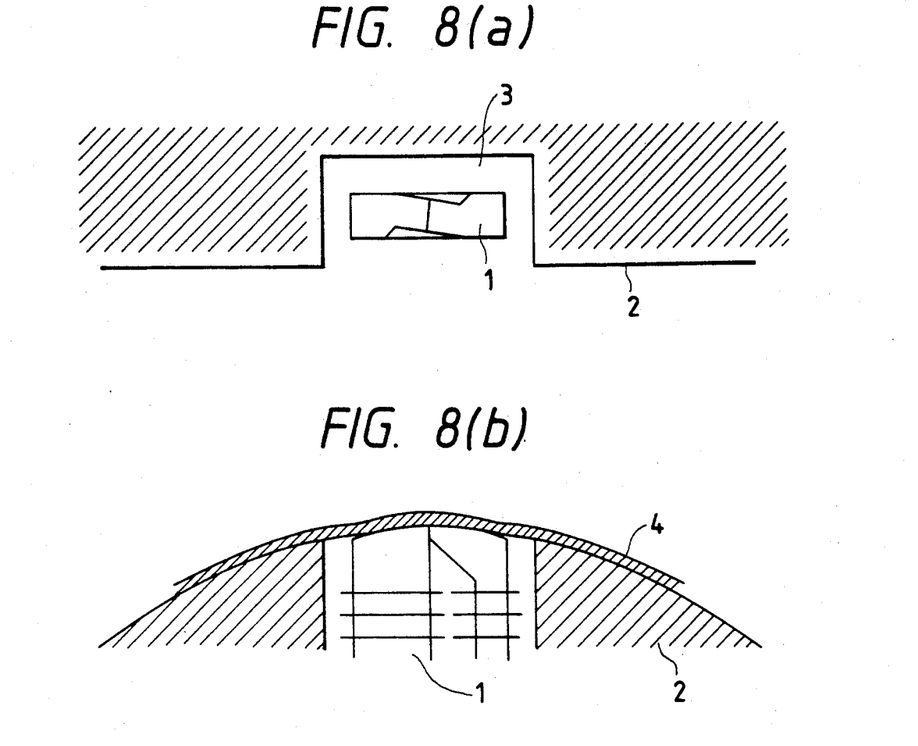
FIGS. 8(a) and 8(b) are similar to FIGS. 7(a) and 7(b), showing a case where a length of the window in a head sliding direction is short.

As shown in FIG. 7(b) the tape 14 is convexed by the head 11 while concaved on the both sides thereof. The deformation of tape by the head and the gaps on the both sides of the head is preferable in view of good head touch. On the other hand, when, as shown in FIGS. 8(a) and 8(b), the window is small with respect to the head, i.e., the distances $a$ and $b$ are small, an amount of tape wound on the head becomes small. Particularly, this is enhanced when air is taken in between the tape and the drum and the tape floats up or when the relative speed of the tape with respect to the head is high, resulting in an increased spacing between the tape and head. With such large spacing, the loss thereby is not negligible causing a reproduction output to be degraded. This is enhanced when the recording wavelength is short. In detail, the amount of tape floating on the inlet side of the head becomes large due to air taken in, causing the contact between the tape and the head to be degraded. Therefore, the distance of the window in the tape running direction should be selected by taking the tape winding on the head into consideration. Alternatively, when the window size exceeds a certain value, the concave deformation of the tape on the both sides of the head becomes too large, resulting in the tape damage.

It has been experimentally determined that, when the diameter of the drum is 40 to 150 mm and the relative speed of the tape with respect to the head is 10 m/s to 55 m/s, a good head touch is obtained with the dimensions of the window length l and the gap lengths $a$ and $b$ satisfying the aforementioned relationships.

Figure 9:
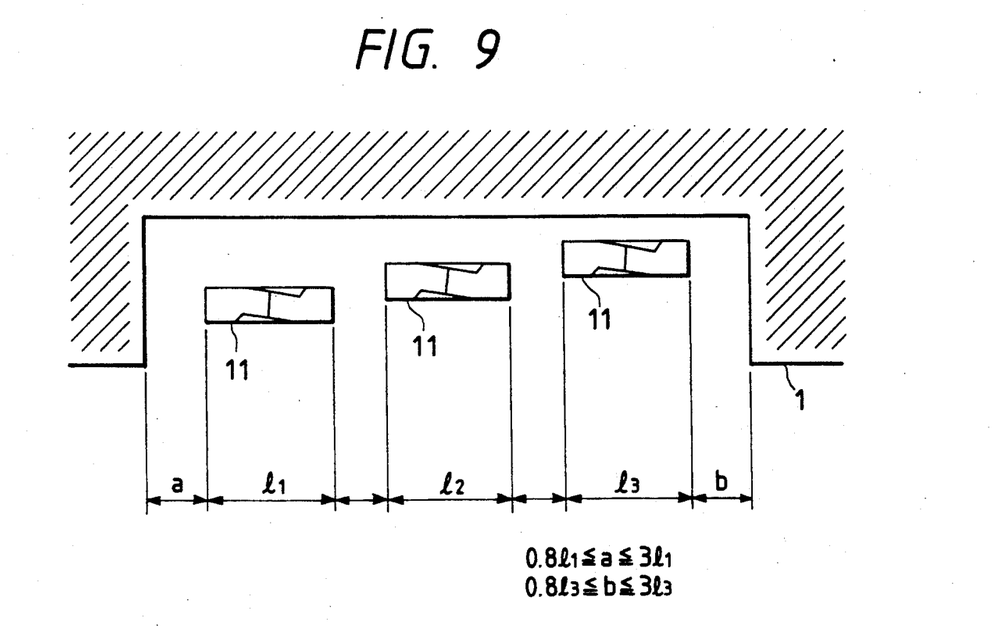
FIG. 9 is a schematic view of a window in which a plurality of heads for different channels are disposed.

FIG. 9 shows another embodiment of the present invention in which a plurality (three) of heads 1 are provided in a window 13 for accommodating a multichannel head to be used in a multi function, high performance VTR.

In this case, values of the gaps $a$ and $b$ should satisfy the following relationships with respect to the head lengths 11, 12 and 13:

$$0.8 l 1 \leq a \leq 3 l 1$$

$$0.8 l 3 \leq b \leq 3 l 3$$

Figure 10:
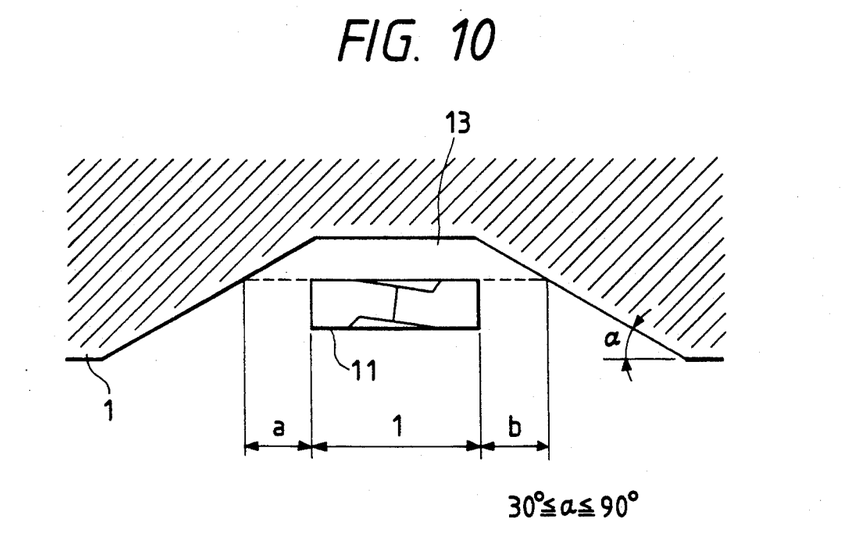
FIG. 10 is a schematic view of another embodiment in which a head window is trapezoidal.

In order to minimize possible damage of tape when the tape enters into the window, it is possible to provide a trapezoidal shaped window as shown in FIG. 10. With a trapezoidal-shaped window, the edge portion of the window contacts the incoming tape and the tape gradually and smoothly contacts the edge portion of the window thereby minimizing the tape damage. The inclination of the edge portion with respect to the rotating direction of the drum is preferably in a range from 30° to 90°.

Figure 11:
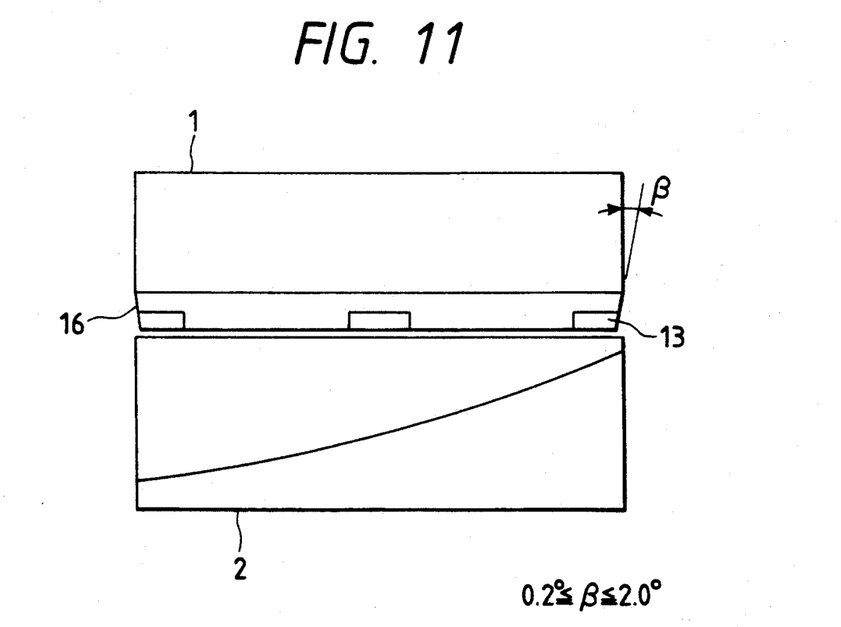
FIG. 11 is a schematic view of a further embodiment of the present invention wherein a lower portion of the upper rotary drum has a plurality of tapered windows.

Further, with respect to the embodiment of FIG. 6, it is possible to provide a taper in only the lower head region of the upper rotary drum as shown in FIG. 11 with the same effect as that obtained in the FIG. 6 embodiment, with the taper angle $\beta$ being in a range of between 0.2° to 2°.

What is claimed is:

1. A rotary drum device for a video tape reorder, including a lower fixed drum, an upper rotary drum rotatably supported by said lower fixed drum and a motor for driving said upper rotary drum at a speed v of a magnetic tape relative to said upper rotary drum in a range defined by:

$$10 \text{ m/s} \leq v \leq 55 \text{ m/s},$$

wherein said upper rotary drum has a surface including a plurality of grooves extending substantially in a direction of rotation of said upper rotary drum so as to provide a surface roughness S satisfying the following relationship:

$$1 \text{ μm} \leq S \leq 2 \text{ μm}.$$

2. The rotary drum device claimed in claim 1, wherein a pitch P of said surface roughness of said upper rotary drum satisfies the following relationship:

$$0.05 \text{ mm} \leq P \leq 0.3 \text{ mm}.$$

3. A rotary drum device for a video tape recorder, including a lower fixed drum, an upper rotary drum rotatably supported by said lower fixed drum and a motor for driving said upper rotary drum at a speed v of a magnetic tape relative to said upper rotary drum in a range defined by:

$$10 \text{ m/s} \leq v \leq 55 \text{ m/s},$$

wherein said upper rotary drum has a surface roughness S satisfying the following relationship:

$$1 \text{ } \mu\text{m} \leq S \leq 2 \text{ } \mu\text{m, and}$$

wherein said surface of said upper rotary drum is formed with at least three grooves each having a width of 100 μm or more.

4. A rotary drum device for a video tape recorder, including a lower fixed drum, an upper rotary drum rotatably supported by said lower fixed drum and a motor for driving said upper rotary drum at a speed v of a magnetic tape relative to said upper rotary drum in a range defined by:

$$10 \text{ m/s} \leq v \leq 55 \text{ m/s},$$

wherein said upper rotary drum has a surface roughness S satisfying the following relationship:

$$1 \text{ } \mu\text{m} \leq S \leq 2 \text{ } \mu\text{m, and}$$

wherein a diameter of said upper rotary drum gradually tapers in a downward direction of said upper rotary drum to a diameter of said lower fixed drum so that a taper angle $\theta$ is provided satisfying the following relationship:

$$0.03° \leq \theta \leq 0.15°.$$

5. A rotary drum device for a video tape recorder, including a lower fixed drum, an upper rotary drum rotatably supported by said lower fixed drum and a motor for driving said upper rotary drum at a speed v of a magnetic tape relative to said upper rotary drum in a range defined by:

$$10 \text{ m/s} \leq v \geq 55 \text{ m/s},$$

wherein said upper rotary drum has a surface roughness S satisfying the following relationship:

$$1 \text{ } \mu\text{m} \leq S \leq 2 \text{ } \mu\text{m, and}$$

wherein a diameter $D_1$ of a lower portion of said upper rotary drum and a diameter $D_2$ of said lower fixed drum satisfy the following relationship:

$$D_1 = D_2 + \alpha,$$

where:

$$0 \leq \alpha \leq 20 \text{ } \mu\text{m}.$$

6. The rotary drum device as claimed in one of claims 1, 3, 2, 4 or 5, wherein said angle with respect to a running direction of the magnetic tape.

7. The rotary drum device as claimed in one of claims 1 3, 2, 4, or 5, wherein at least one window extending in a rotating direction of said upper rotary drum is formed in said surface of said upper rotary drum for receiving at least one magnetic head, and wherein a length of said drum in the rotating direction of said upper rotary drum is selected such that a distance a between a first edge of said window and a first end of said at least one magnetic head received therein and a distance b between an edge of said window opposite said first edge and an end of said magnetic head opposite said first end satisfy the following relationship with respect to a length l of said at least one magnetic head in the rotating direction of said upper rotary drum:

$$0.8l \leq a \leq 3l,$$

$$0.8l \leq b \leq 3l.$$

8. The rotary drum device claimed in claim 7, wherein a plurality of magnetic heads are provided, the respective magnetic heads having lengths $l_1, l_2 \ldots l_n$, arranged in series in the rotating direction of said upper rotary drum and in parallel in a direction orthogonal thereto, and wherein the distances a and b satisfy the following relationship:

$$0.8 \text{ } l \text{ } 1 \leq a \leq 3 \text{ } l \text{ } 1,$$

$$0.8 \text{ } l \text{ } n \leq b \leq 3 \text{ } l \text{ } n.$$

9. The rotary drum device claimed in claim 7, wherein the length of said window in the rotating direction of said upper rotary drum is gradually increased toward a lower end of said upper rotary drum at an angle $\alpha$ with respect to the rotating direction of said upper rotary drum so as to satisfy the following relationship:

$$90° \geq \alpha \geq 30°.$$

10. The rotary drum device claimed in claim 7, wherein a lower portion of said upper rotary drum is tapered with respect to the rotating direction of said upper rotary drum at an angle $\beta$ satisfying the following relationship:

$$0.2° \leq \beta \leq 2.0°.$$

* * * * *